United States Patent [19]

Sims et al.

[11] 4,175,224

[45] Nov. 20, 1979

[54] APPARATUS FOR TRANSPORTING HEAVY EQUIPMENT ON A PIPELINE

[75] Inventors: Eugene F. Sims; Trueman Dierlam, both of Houston, Tex.

[73] Assignee: CRC-Crose International, Inc., Houston, Tex.

[21] Appl. No.: 788,550

[22] Filed: Apr. 18, 1977

[51] Int. Cl.$^2$ ............................................. B23K 37/02
[52] U.S. Cl. ................................. 219/60 R; 104/118; 104/120; 105/141; 105/145; 219/60 A
[58] Field of Search .................... 219/61, 60 R, 60 A; 200/52 A; 266/54; 104/118, 119, 120; 105/141, 144, 145

[56] References Cited

U.S. PATENT DOCUMENTS

| | | | |
|---|---|---|---|
| 1,872,114 | 8/1932 | Burnish | 219/61 |
| 2,629,002 | 2/1953 | Tinker | 104/118 X |
| 2,757,749 | 8/1956 | Cooper | 200/52 A |
| 3,102,187 | 8/1963 | Coscia | 219/60 A |
| 3,266,700 | 8/1966 | Bauer | 219/60 A |
| 3,677,188 | 7/1972 | Bordes | 104/120 |
| 3,681,560 | 8/1972 | Stanley | 219/61 |
| 4,051,342 | 9/1977 | Stubbings | 219/60 A |

*Primary Examiner*—Richard R. Kucia

*Attorney, Agent, or Firm*—Edwin M. Thomas

[57] ABSTRACT

Apparatus is disclosed for transporting heavy equipment such as welding current generators, a prime mover therefor, and associated devices or supplies, on and along a pipeline, the pipeline serving as a monorail. The apparatus, of elongated construction along the pipeline, is supported at one end and propelled along the line by power driven traction means engaging the top part of the pipeline. The opposite end of the apparatus is supported on a pair of laterally spaced swivel mounted wheels which engage the sides of the pipeline laterally away from and somewhat below the top of the line. The latter wheels give lateral support and stability to maintain the apparatus in a substantially upright position on the pipeline. Sensing means, such as a pendulum, mercury switch means, or equivalent, detect incipient tilting or motion towards instability and are used to steer the swivel mounted wheels, either directly or indirectly. Indirect steering is accomplished through auxiliary side wheels which are directed to raise one side and lower the other of the apparatus to restore it to upright position when needed. Hydraulically operated pipe gripping means are provided to clamp the apparatus to the pipeline when it is not traveling, as during a welding operation.

10 Claims, 11 Drawing Figures

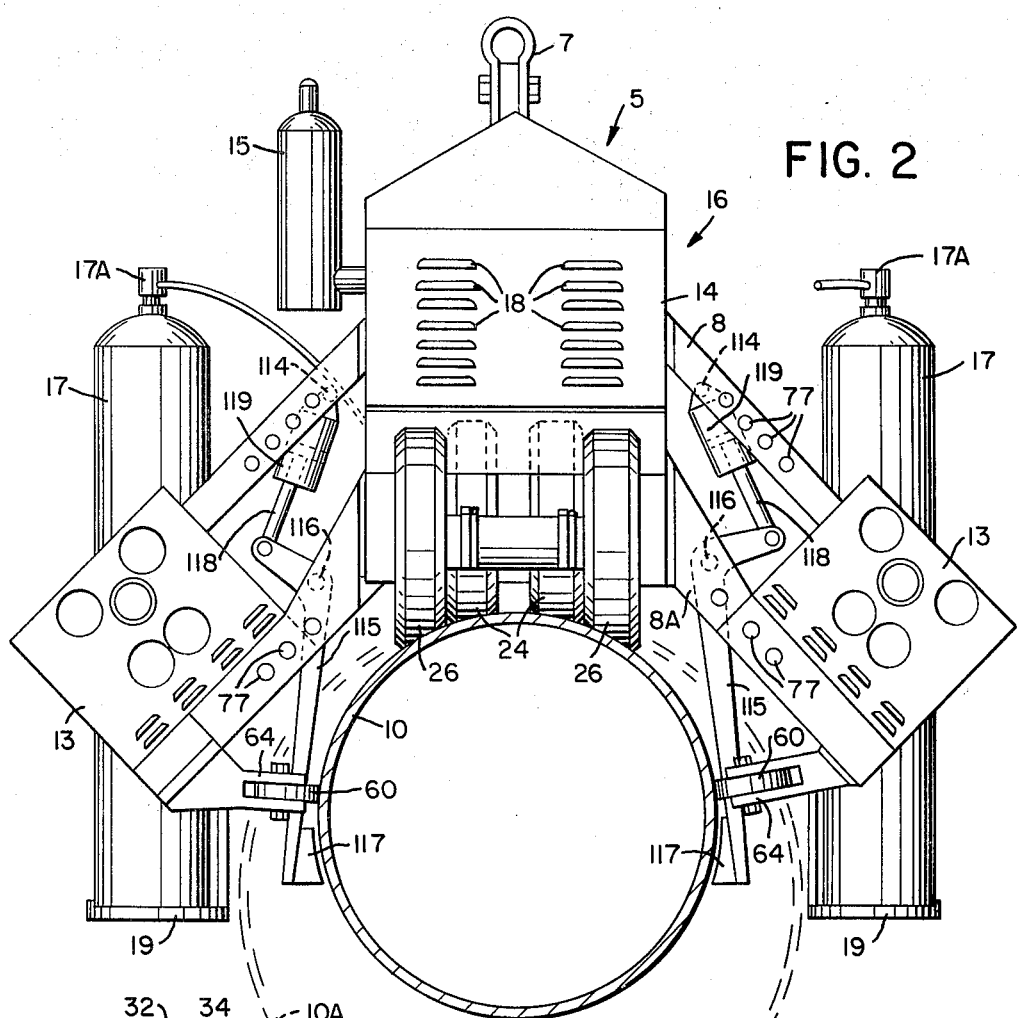
FIG. 2
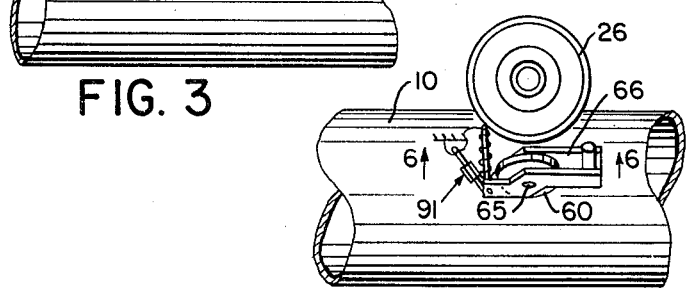
FIG. 3
FIG. 4
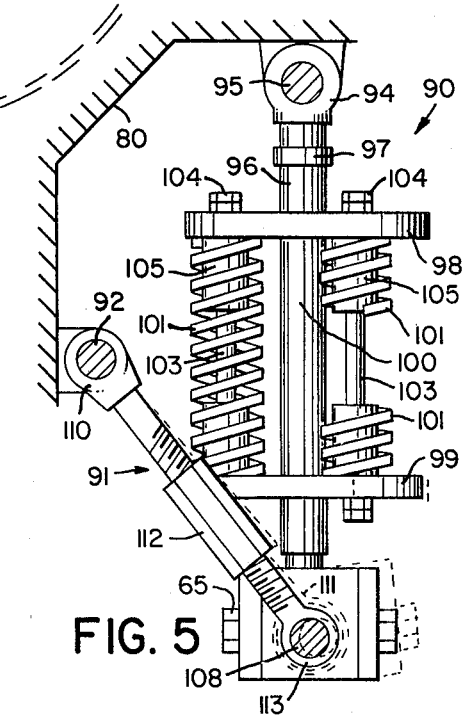
FIG. 5

APPARATUS FOR TRANSPORTING HEAVY EQUIPMENT ON A PIPELINE

BACKGROUND AND PRIOR ART

Recent developments in pipeline construction include the use of automatic or at least semi-automatic welding apparatus and equipment at plural stations, to make girth welds in a series of separate steps for each joint. Such welding is usually accomplished by traveling electric arc welding devices which orbit around or part way around each joint. These heat the pipe end metal and fuse electrode material into the joint step by step, in such a manner as to cause the weld metal to fuse intimately into the pipe end metal. The preferred systems accomplish the welding in a series of sequential steps, using several welding stations at sequential pipe lengths along the line. In a particularly preferred system, a new length of pipe is first secured to the front end of the line by an internal "stringer bead" forming operation. In this, one or more internally orbiting devices inside the pipeline form a partial weld at the inner surface of the pipe which is strong enough to hold the parts together until reinforcing or supplemental weldments can be made. This internal bead also serves as a backing to prevent subsequent weld passes from projecting or burning through to the interior, which would result in weld flaws.

After the internal weldment has been thus produced, as described more particularly in Nelson and Sims, U.S. Pat. No. 3,461,264, for example, by the internal apparatus, which also comprises a clamp for holding the adjacent pipe ends in proper welding position during stringer bead formation, the clamping means are relaxed and the welding apparatus is moved to the front end of the line to weld the next pipe length in place. Electric generating means must step forward from joint to joint in similar manner. The consecutive pipe lengths are usually around 40 feet (about 10 meters) long but, in some cases, "double jointing" is practiced, wherein two lengths of 40 foot pipe are secured together before installation in the line, making the field-installed welds 80 feet or about 20 meters apart. In some cases, even triple-jointing is practiced, to further reduce the number of welds that must be made in the field. In such cases, of course, the consecutive welds made in the field would be about 120 feet or about 30 meters apart.

While the first or internal stringer bead is being welded, supplemental filling and capping weldments are being performed simultaneously at one, two, three or more stations behind the front of the pipeline. Each of these stations requires a power source. In the preferred system, externally orbiting automatic welding instruments, such as the general type of apparatus described in a U.S. Pat. No. 3,806,694 to Nelson, Pollock and Randolph, are being used to perform the supplemental welding operations. Each arc welding instrument is mounted on a tensioned flexible guide track in the form of a strong metal band tightly secured around the pipeline at a location accurately spaced from the joint to perform a precision joint filling or completing operation. Such guide band and traveling carriage means to support the welding instrument and guide it in its orbital travel with high accuracy, are preferably similar to those described in U.S. Pat. No. 3,604,612 to Miller and Nelson. However, in some cases, other welding, carriage and guide means may be used. In any case, it is usually preferred to weld by moving each of two instruments half way around the pipe circumference. One instrument serves to form a weldment half way around for this particular pass, and a separate instrument is moved orbitally around the other half circumference. Therefore, two welder instruments and two separate sources of electric power for each station may be required.

In a typical large diameter pipeline, the girth joints may require several weld passes in addition to the first or "stringer bead" welding pass mentioned above, including a so-called "hot pass". In this pass, the internal part of the joint is highly heated and weld metal is fused, deposited into and firmly bonded to the pipe metal. A so-called "filler pass" may next be inserted, at a station farther back, to further fill the gap between the pipe ends outside of the "hot pass"; this may be followed by a "capping" or joint completion pass. With heavy wall pipe, two or more "filler" passes outside the "hot pass" may be required and, in some cases, a secondary or finishing "capping" pass may be desired. Therefore, in order to complete a welded joint, the internal or first pass may be followed by two, three or more external operations, each of which requires for each instrument a separate power source at the station, with a pair of half circle orbiting welding instruments, each with its own carriage on a guidetrack or band being operated at each station. Thus, except for the front or inner weld forming station where a single generator may suffice, there will be required a pair of generators at each station, the whole job requiring three, four or more generating sets, a pair of generators being required at most of the stations. These generators are needed near their respective stations, whether mounted on the line, or along it, at pipe length intervals. The intervals, as noted above, may be 40 feet, 80 feet, or more.

In the past, it has been common practice to mount a generator, with its individual diesel driver engine or other prime mover, on a heavy track laying tractor or to transport it on its own wheels by means of a tractor along the pipeline from station to station as welding proceeds. Each of these machines including the tractors costs many thousands of dollars, so that very heavy investments are involved. Because of the size and type of tractors, it has been necessary to build a solid roadway along the pipeline to support them. While it has been known, in the past, to mount certain apparatus appurtenant to pipelining on the pipeline itself, such has been limited in the past generally to small, light weight apparatus, such as spray coating devices and the like. An important object of the present invention is to substantially reduce pipeline construction costs, and capital equipment costs, by using much smaller simpler carriage vehicles without requiring tractors and using the pipeline itself as a roadway for the relatively small vehicles. Another object is to insure stability of the equipment on the line by making it self steering and/or self stabilizing. A further object is to provide emergency braking or locking means to secure the carriage to the line. Further objects of this invention will become apparent as this description proceeds.

BRIEF DESCRIPTION OF DRAWINGS

FIG. 2 is a front end view of the apparatus of FIG. 1, the pipeline being shown in section.

FIG. 3 is a fragmentary side view, with parts removed.

FIG. 4 is another fragmentary view from the side, with certain parts removed for better illustration.

FIG. 5 is a fragmentary view, partly in section, showing a spring mounting means for a guidance wheel used at the sides for stabilizing the apparatus on the pipeline.

FIG. 6 is a transverse and partly section view of a guidance wheel assembly, taking substantially along the line 6—6 of FIG. 4.

FIG. 7 is another view of the same parts, taken substantially at right angles with respect to FIG. 6.

FIG. 10 is a view, somewhat similar to FIG. 6, showing a modified support and steering means for controlling a side mounted guidance wheel.

DESCRIPTION OF PREFERRED EMBODIMENT

Figure 1:
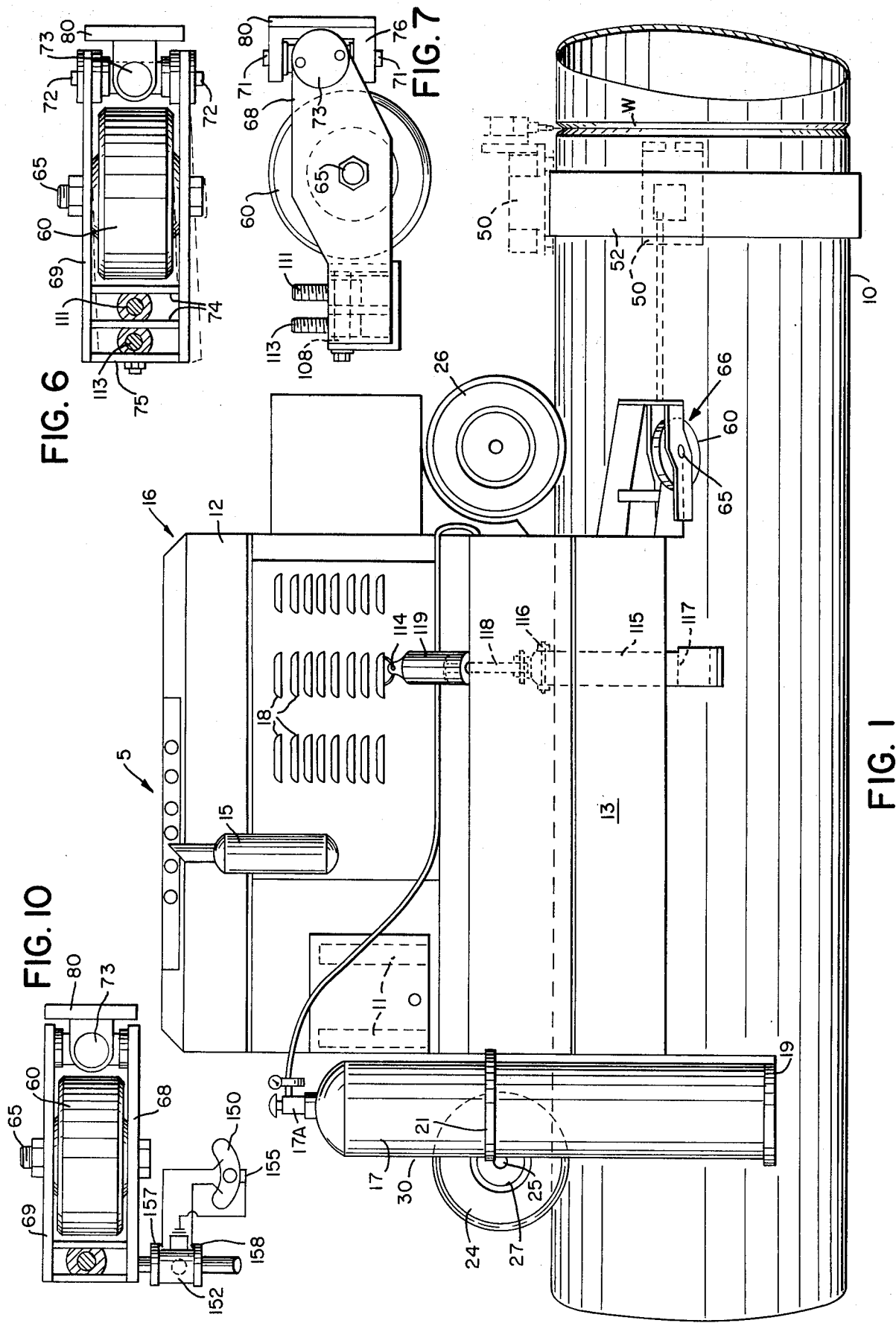
FIG. 1 is a side view, in elevation, showing a preferred form of the apparatus mounted on a pipeline.

Referring first to FIGS. 1 and 2 of the drawings, there is shown an apparatus mounted on a pipeline 10, comprising a carriage 5 loaded with a power generating system for supplying welding current to an arc welding operation for joining the pipe sections together, end to end. A lifting clevis 7 permits the apparatus to be set into the pipeline by a lifting crane, not shown. The apparatus is adapted to run along the pipeline which supports it, the pipeline thus constituting a monorail for the carriage. The pipeline 10 may be of various diameters, a larger one being shown at 10A, FIG. 2. It is intended that the carriage be adaptable to ride on pipelines of various diameters, while requiring minimal adjustment or modification to fit the several commercial diameters, which may range from as little as 16 inches to 60 inches or more. In most cases, the parts can be adjusted; in some instances parts of different lengths, sizes or angular projections may be needed to accommodate unusual pipe sizes as will be obvious. The carriage 5 is supported on pneumatic tired wheels, traction wheels 24 being at the rear and caster-mounted or steerable non-driven wheels 26 at the front. The mounting of all these wheels will be more fully described below. A prime mover, such as a diesel or gasoline engine 12 is mounted atop the carriage 5. It has a cooling system 14, exhaust system 15, etc., and is enclosed in housing 16. An electric generator 13 is mounted on each side of the carriage. Tanks 17 of compressor inert gas are carried too; the gas will be used for shielding the electric arc during welding. Other materials, such as supplies of consumable electrode material, spare parts, and the like, may be carried as well.

According to the present invention, the carriage 5 is designed to be supported on and travel along the pipeline 10, which serves as a monorail support, eliminating the necessity for a side road which has usually been required for the pipeline service equipment. Many, probably most, pipelines must be built through rugged country, over hills and mountains, across deserts, through forests, over or under rivers and streams and through marshes and swamps. The building of a road adds substantially to the cost of pipeline construction and the present invention is intended to greatly reduce or eliminate this expense. The welding of girth joints where the initial lengths of pipe are jointed together end to end consumes considerable electric energy and necessitates efficient generating equipment of adequate power. The generators, with their drive motors and ancillary equipment are fairly heavy by themselves. In the past they have been mounted on separate wheeled carriages and/or transported by or on expensive tracklaying vehicles; the latter add further to the cost and may be largely replaced by the present invention.

The successive lengths or joints of pipe built into a pipeline must be welded end to end at W, usually by an arc welding process. Generating equipment must be at hand for each welding step. It is usual practice to form the welded joints in steps or stages, especially in heavy wall pipes, and separate generator means are required for each step or stage. In a presently preferred system, the first or "stringer bead" weld, the one that secures the pipe sections together initially, is performed internally by a clamp-mounted orbitally-moving internal welding device. Such a system is described and claimed in a U.S. Pat. No. 3,461,264, of Nelson and Sims, mentioned above and assigned to the present assignee. Such a device is not shown in the drawings herein, being no part of the present invention, but it requires its own current supply at the front end of the pipeline. The initial weld is made strong enough to hold the pipe sections together and support the carriage 5 with its load of equipment as it travels to the front end of the line. After the first pass or internal stringer bead weld has been formed and the new length of pipe joined to the line, the weld is only partially complete.

Supplemental welding steps are performed from the outside. For this purpose, it is preferable to use an automatic self-propelled welding device or pair of devices which travel orbitally around the pipe or half way around it at each station. Each device carries its own supply of welding wire or electrode material. For accurate guidance of its orbital movement, the welding device 50, shown only diagrammatically in dotted lines in FIG. 1, is supported in its orbital path by a guide track, a strong metal band 52 which is flexible enough to conform to the pipe circumference, and is supported at frequent intervals by small studs or feet resting on the pipeline. The band is tensioned tightly around the pipe next to the girth joint to be filled. The guide band is rigid enough and under such tension that it is not damaged by the relatively soft wheels of the carriage 5; several bands may be in place along the pipeline as several operations are performed in sequence. The band and self-propelling orbital carriage 50 per se are preferably of the general type described and claimed in the above mentioned U.S. Pat. No. 3,604,612, to Nelson and Miller. The welding device per se, mounted on and carried around the pipe by the orbiting carriage 50, is not shown in detail but is preferably of the general type shown in U.S. Pat. No. 3,806,694 to Nelson, Pollock and Randolph. However, other types may be used, if desired.

In any case, it is preferable to perform the welding increments at each station in two parts, using one welder for each side or half-circumference of the pipe. This requires not only two instruments but also two sources of electric energy at each station, hence two generators are preferred on each carriage 5. The generators 13 are driven by belts 11 from engine 12, the belts being enclosed in a housing 16 sloping outwardly and downwardly from the engine. This part of the housing is supported by strong bars 8 and 8A which support not only the generators but also side guidance wheels 60 and their mounts, to be described further below. On each side, the carriage supports also a tank 17 of compressed inert gas, such as carbon dioxide, nitrogen, argon or the like, which is used to shield the arc and prevent the new weld from being oxidized as it forms. A bracket 19 supports each tank and a strap or band 21 secures it firmly in place. Connections 17A are provided to take this gas to the welding units 50.

An obvious problem involved in supporting and traveling a carriage such as 5 along a pipeline is that of keeping it balanced and upright on the line. With the largest diameter pipelines, this is less of a problem, being more difficult as the lines decrease in diameter. With lines of smaller to medium diameters, such as 20 to 36 inches or so, an effective balancing means must be provided in all cases and even with larger lines it is desirable if not essential.

According to the present invention, the carriage is provided with position-sensitive guidance and/or balancing means and preferably is self-steering so that as the carriage moves along the pipeline it will immediately correct any deviation from the desired upright position. This is designed to keep the carriage upright regardless of pipeline size, slope, or displacement laterally. While the motor-generator set is operating at a station or joint, holding or braking means are engageable to clamp the carriage to the pipeline. It will be assumed that a suitable control power may be obtained either from the prime mover 12 through hydraulic pump means driven by this motor, or that electrical power to operate electric controls will be available from a generator or from a battery.

First, a more general description of the apparatus will be given, followed by detailed description of vital travel elements and means for their control.

The generator drive engine is housed in the enclosure 16, provided with a cooling system including louvres 18 arranged to keep out dust and dirt as far as practicable. Underneath the housing a strong support frame 22 is provided, with appropriate frame elements to support a pair of drive or traction wheels 24 at the rear and a pair of swivelled and/or steerable caster mounted front wheels 26. All of these wheels are preferably provided with appropriate low-pressure pneumatic tires which will adhere firmly to the pipe surface. The rear drive wheels are close together axially, in order to avoid or minimize the need for a differential gearing device in the rear axle; the front wheels 26 are much farther apart to give definite side contact with the pipeline, thus to contribute to stability. Pipelines are often curved sufficiently that considerable friction could result if the two rear drive wheels should be spaced far apart on a rigid axle. The axle 25 which bears the rear wheels is firmly fixed to both of them and bears a sprocket 27 which is driven by a chain 30 from a suitable hydraulic drive motor 32. See also FIG. 3. Motor 32 is driven by fluid under pressure derived from an engine-driven pump, not shown, within the housing 16. However, in some cases it may be preferable to use an electric drive motor, powered either from a generator or from a storage battery. As shown, the motor is supplied with driving fluid through lines 34 and 36.

Figure 11:
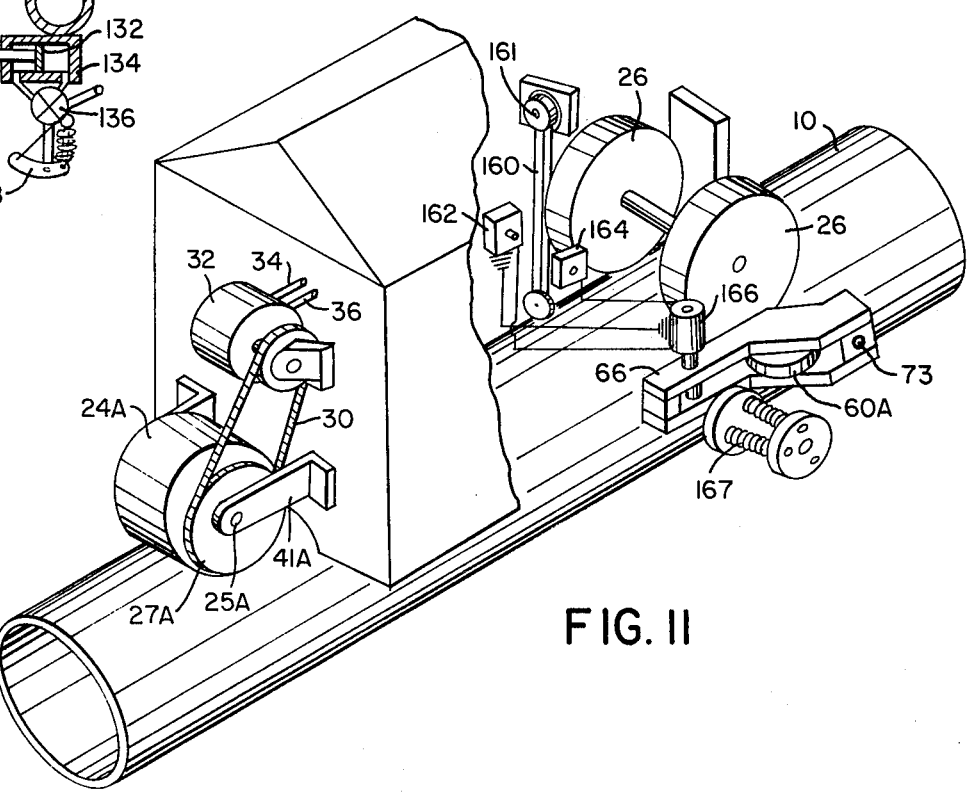
FIG. 11 is a perspective view of an apparatus generally similar to FIGS. 1 and 2, with some of the guidance and drive parts modified.

In some cases, particularly with large diameter pipelines, it is possible to use a single board tired wheel 24A, as shown in FIG. 11, which substantially avoids the problem of wheel slippage on curves but at the expense of some stability. With smaller lines the rear wheels are preferably paired as in FIG. 2, but not spaced too widely apart. The axle 25 or 25A for the rear wheels 24 or wheel 24A is mounted in suitable bearings supported by frame members 41, FIG. 3, or 41A, FIG. 11. The weight of the carriage with all of its carried equipment is divided about equally between the front and rear wheels.

The pneumatic tires on wheels 24, 26, are preferably under fairly low pressure so they will somewhat "wrap" around the pipeline. They will normally provide all the resilient support needed for the carriage, since the pipelines offer relatively smooth traveling surfaces. In some cases, the wheels may be provided with spring mounts individually or in pairs but these are not usually required. These wheels must, of course, run over a number of the bands 52 in many cases since usually there will be several such bands on the pipeline, to provide for multiple pass welding at several stations. These stations will commonly be about 40 feet apart (10 meters) for conventional pipe lengths, or twice or three times as much for double or triple jointed pipe lengths, as is well understood in the art. In any case, a carriage with its power equipment and auxiliary supplies will be required at each station. Only one station is shown in the drawings. As each carriage usually must run over a number of bands 52, this must be done in such a way as not to damage the guide bands or to upset the equilibrium of the carriage. Guidance wheels 60 are arranged, preferably, in line transversely with the front wheels 26 (or 26A, FIG. 11), so that when the carriage is raised slightly as it passes over a guide band, the side guidance wheels will also be lifted away from heavy contact with the bands but without losing their stabilizing function.

The guidance wheels 60 are arranged, as shown in FIG. 2, to engage the sides of the pipeline at points near or well towards the vertical middle of the pipeline sides. Since the machine is designed to operate over pipelines of widely varying diameters, the guidance wheels and/or the means which support them are made adjustable or, if desired, subassemblies of different dimensions for holding wheels 60 may be substituted, as when transferring from a very small to a very large line, or vice versa. Preferably, the large arms 8 and 8A which support the generators and their housings can be adjusted angularly for wider spread, or their lengths may be changed by adjustments 77, 77, FIG. 2. Obviously, if these arms are changed in length, it may be necessary to change the generator drive belts 11 or to provide them with adjustable tensioning means.

The mounting of the guidance wheels directly in transverse line with the front wheels simplifies the problem of steering as well as providing for the guidance wheels to be lifted somewhat as the front wheels 26 are lifted when they pass the annular bands 52. Unlike the main wheels 24 and 26, however, the guidance wheels 60 are also provided preferably with individual spring mounts and these are designed so as to assist in making the guidance wheels self-steering, in the preferred arrangement, which will be described next.

In FIGS. 1 and 2 the wheels 60 are shown diagrammatically only as being mounted in simple brackets or forks 64 or 66 for simplicity, but preferably a more sophisticated mounting will be used. As best shown in FIGS. 5, 6 and 7, each wheel is mounted on an axle 65 supported in an elongated box-like frame 66. Each such frame comprises a pair of side plate members 68 and 69, spaced apart far enough to receive the wheel by a front end member in the form of a universal joint assembly 73 and by intermediate and rear spacer plates 74 and 75. The universal joint 73 has its end pintles 72 mounted in the side plates 68 and 69 and its middle transverse pintles 71 are mounted in the arms 76 of a bracket 78 secured to an appropriate fixed frame element 80. This universal joint assembly makes it possible for the box frame 66 to be rotated relatively to bracket 78 and frame 80 to be swung to various angles therefrom.

The left or rear end of the box frame 66, as seen in FIGS. 6 and 7, see FIG. 5 also, is supported by a combination of a spring mount 90 and a fixed-length link 91 secured to a fixed stud element 92 in the frame element 80. The spring mount itself comprises an upper or outer eyebolt 94 mounted on fixed stud element 95 and threaded into an assembly which includes an internally threaded nut or turnbuckle member 96, with a lock nut 97. A round disc shaped plate 98 is fixed to member 96. The opposite end of member 96 is bored out to receive smoothly and slidingly a shaft 100 which bears a plate 99 similar to plate 98. The lower or inner end of shaft 100 is formed with an eye 111, FIG. 5, to receive a transverse shaft 108 mounted in plates 75 and 74 of the box frame 66, FIG. 6.

A plurality of, e.g. 3, compression coil springs 101 are mounted between plates 98 and 99, to be compressed when these plates move relative towards each other, due to application of force by the carriage load shifting towards that side of the pipeline. These springs are held in place and guided in their compression and expansion by bolts 103 which pass through them and through matching holes in plates 98 and 99. The bolts can be adjusted in length to set a maximum spacing between plates 98 and 99, and lock nuts 104 are provided to maintain the preset spacings. Supplemental guidance for springs 101 is provided by sleeves 105 fitted into the opposite ends of the springs on bolts 103.

The fixed connector link 91, which is preset to a definite length, comprises eyebolts 110 and 113 at its opposite ends, connected by an adjustable nut or turnbuckle 112. One eyebolt 110 is attached to the fixed stud 92 in frame element 80 and the other end 113 is attached to the shaft 108 on which the lower end of the spring mount 90 is also fixed. When a shift of the carriage occurs to one side of the pipeline center, this adds weight to that side of the carriage load and compresses the springs 101. As a result, there is relative motion between plates 98 and 99 and the shaft 100 slides farther into the hollow member 96. Subframe 80 moves correspondingly towards the box frame 66 but since link 91 is of fixed length (after its preset adjustment) the box frame is forced to swing to the right, or counterclockwise about pivot 95, as seen in FIG. 5, to the dotted line position. This changes the direction of the wheel 60 along the side of the pipeline, directing it upwardly as seen in dotted lines, FIG. 6, so as to shift the load away from that side towards the other side of the pipeline. On the other side of the pipeline, meanwhile, the other guidance wheel 60, in a similar box frame, is at the same time being directed downwardly with respect to the pipeline side wall, since pressure on its spring mount has been reduced allowing springs 101 to expand. As the load becomes rebalanced, equal tension is applied to the spring mounts 99 on either side of the pipeline and the wheels 60 resume their straight line travel along the pipe. By preadjustment, the spring mounts 90 and the fixed length links 91 will be set so that the springs will be under some but equal compression when the load is balanced. Thus, they will be compressed sufficiently that the one on the underloaded side of the line will expand and redirect its wheel 60 to help the other wheel reestablish centering and load stability.

In order to provide insurance against the carriage running inadvertently along the pipeline or tilting to one side while the engine is operating at a station, as when a welding operation is underway and there may be vibration, an emergency clamping or braking means is provided. At times the pipeline may be ice-covered and very slippery, or it may be on an incline up or down. Also, filling operations may be going on, or other operations involving use of heavy equipment, which might jolt the line and cause an unfastened carriage to slip or fall.

Such emergency or clamping means are shown in FIGS. 1 and 2. The comprise a pair of bell cranks or arms 115, pivoted at 116 to the carriage frame, and bearing at their outer or lower ends clamping or braking pads or shoes 117. These pads are compressible to some extent so as to accommodate the different curvatures of pipelines of different diameters. They may be made of polyurethane resin or other resilient plastic composition, preferably containing friction-improving grit or analogous materials to provide firm grip with the pipe surface. The arms or bellcranks 115 are operable by piston rods 118 mounted in hydraulic cylinders 119 which are secured to the frame by pivoted mounts 114. As noted elsewhere herein, the engine-generator system on the carriage is normally provided with a pump for supplying hydraulic fluid under pressure and such is used, under control of valve means of obvious type, not shown, to actuate the arms 115 to or from braking or clamping position.

Pads or brake shoes 117 are resistant against moisture and dirt, as well as heat and sunlight, so that they will perform their functions of braking or clamping over long periods of time. The braking means just described may be connected to position-sensitive control means, such as a pendulum or a mercury switch, operating valve means to apply the brakes automatically in case the carriage should tilt measurably towards one side or the other of the pipeline. Such means are not described herein but may be analogous to the means shown in either FIG. 8, FIG. 10 or FIG. 11 which are connected with steering functions, as mentioned above and as will be further described hereinbelow.

Figure 8:
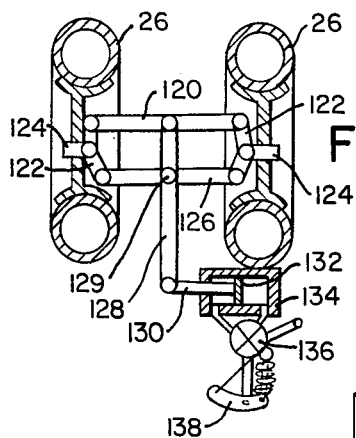
FIG. 8 is a schematic view, on a smaller scale, of a modified steering means.

Instead of using the side or guidance wheels 60 for steering, in the manner described above, it may be preferred in some cases to steer the front wheels 24 for guiding the carriage. There may be advantages in the case of large diameter pipelines, particularly. Since these wheels 26 or 26A are preferably caster or swivel mounted, they may easily be made steerable. FIG. 8 shows a modification for this purpose. Here the wheels 26 are mounted on stub axles 124 supported in the middle of caster arms 122 which are mounted on a fixed frame member or bar 120. The rear ends of caster arms 122 are connected together by a drag link 126 and a swing bar or lever 128 is pivoted at its front end to member 120 and at its rear end to a piston rod 130. The lever 128 is also pivoted at 129 to the mid point of the drag link 126. Piston rod 130 bears a piston 132 in a hydraulic cylinder 134. The latter is supplied with pressured fluid through a control valve 136 which is reversible to push piston 132 in either direction. A mercury switch 138, sensitive to the position to the carriage atop the pipeline, is arranged to operate the valve 136 in either direction to shift the load back to upright position by steering the front wheels 26 appropriately. This type of steering is more appropriate for larger diameter pipelines where the wheels 26 can rest on moderately sloping portions of the pipe and still be spread far enough apart to provide lateral stability.

Figure 9:
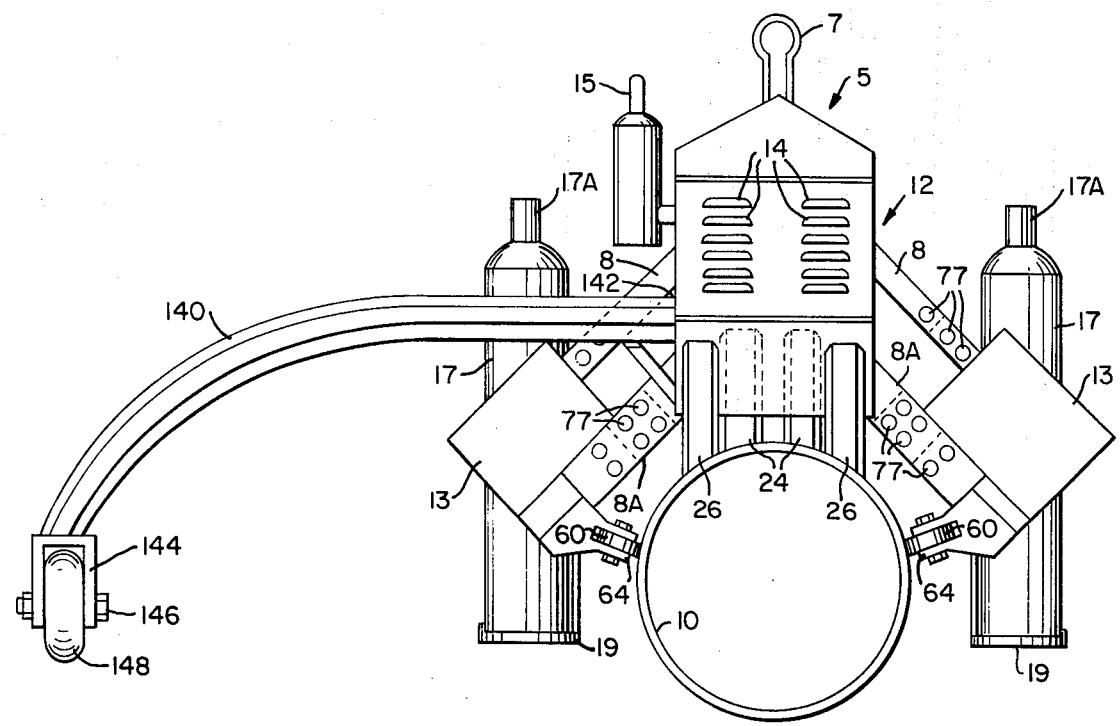
FIG. 9 is a front end view of a different modification of the apparatus, being generally similar to FIG. 2.

With any of the steering means described above there is ordinarily no need for an "outrigger," although such an arrangement may be provided to assist in stabilizing the load balance if desired and if terrain alongside the pipeline permits. Such a device is shown in FIG. 9 and may be desired in the case of unusually small pipelines, or in cases where there is unusual tendency to instability of the carriage on the pipeline. In this case, a strong curved arm 140 is bolted, preferably removable and adjustably, to the frame of the carriage at 142. The outer end of this arm bears a fork 144 which embraces the opposite ends of an axle 146 on which a pneumatic tired vehicle wheel 148 is mounted. When this outrigger is used, the load will be purposely biased towards the outrigger side so as to maintain a suitable holddown force on the wheel 148. When this is used, it may be possible to disable or take off the guidance wheels or to disable the steering mechanism, although in many cases it will be desirable to continue use of the steering mechanism, using the outrigger only to insure against upset which might occur under unusual conditions. Obviously, the use of an outrigger is not preferred because it requires at least a narrow pathway alongside the pipeline, which may be difficult or expensive to provide.

The same principle of steering, described in connection with FIG. 8 above, can be applied to steering of the guidance wheels. Instead of using the fixed link and spring mount connections of FIG. 5, the box frame can be steered under control of a position sensitive device, such as the mercury switch of FIG. 8. FIG. 10 shows such an arrangement wherein the box frame 66 and its wheel 60 may be moved pivotally about the universal joint 73 by means of a piston or a solenoid 152 under the control of a mercury switch 150. Here the solenoid 152 is shown grounded to a center terminal 155 of the switch, with opposite end terminals 157 and 158 of the solenoid connected respectively to the outer contacts on the switch 150. When the load shifts in one direction, the mercury switch signals the solenoid to shift the rear end of box frame 66 in the appropriate direction to correct the displacement. At the same time, of course, the wheel on the other side of the carriage is appropriately moved to assist in the correction. A hydraulic cylinder with piston and a fluid valve, reversible under control of the switch can be used, obviously, to replace the solenoid, as in FIG. 8, if desired.

Instead of a mercury switch, a pendulum switch may be used, so long as it is responsive to lateral displacement of the load. The pendulum may be incorporated in the switch itself, or it may be mounted separately. The latter arrangement is shown in FIG. 11, which, in most respects, is like FIG. 1. A pendulum 160 is mounted on a pivot 161 to swing freely from right to left or vice versa, as the load shifts in the same direction with respect to the pipeline center line. The pendulum is arranged to close one or the other of two switches 162 or 164 to activate a solenoid 166. The latter, as well as the switches, is supplied with electric power by a battery or any other suitable source. The solenoid is connected to the rear end of the box frame 66, similar to the arrangement of FIG. 7 or FIG. 10, to shift it up or down as required to bring the carriage back into proper balanced position atop the pipeline. At the same time, the box frame on the other side of the carriage is shifted oppositely, to assist in the realignment and stabilizing of carriage on pipeline. As in the previously described modifications, the box frame 66 is pivoted at its front end in a universal joint 73 or equivalent. Spring mount 167, essentially like mount 90, FIG. 5, holds the wheel 60 firmly against the side of pipeline 10.

In order to prevent the switches 162, 164, from "hunting" in cases where the pendulum is swinging from side to side freely, they are preferably provided with delay means so that they will not be activated unless there is a continuing pressure from the pendulum. Also, the switches will not open so suddenly, when the pendulum leaves contact, as to leave the carriage in an unstable position or condition. The means by which these time delay or control means are operated form no part of the present invention, being obvious to those skilled in the art. Similar controls may be imposed on the switch and operating means of FIGS. 8 or 10, as will be obvious. Electronic components of well known types may be used, if desired, and may be supplemented by sub-control elements which keep the current on until the desired carriage position is attained, even though the switches would otherwise be opened as soon as the pendulum is disengaged from them. The same arrangement may be made with mercury switches. Obviously, instead of using solenoid means, the steering may be accomplished by a fluid motor, as in FIG. 10. Also, instead of applying the control to the side guidance wheels 60 or 60A, the steering may be used to control the front wheels 26, as in FIG. 8.

FIG. 11 shows also a single rear traction wheel arrangement, an optional feature applicable to larger pipelines, where stability is less of a problem than in the case of small diameter pipelines. In this case, a single wide soft tired wheel 24A is mounted on its axle 25A in brackets 41A. The drive sprocket 27A is attached to one side of the wheel and is driven in the same manner as already described, by chain 30 from motor 32. The latter is supplied with hydraulic drive fluid coming in and going out through the lines 34 and 36, as in FIG. 3. If desired, an electric battery driven motor may be used instead of the fluid motor to propel the machine along the pipeline. However, the fluid motor is usually preferred because it can deliver more energy for its size and weight. In other respects, the system of FIG. 11 is essentially the same as that of FIGS. 1 and 2.

It will readily be apparent that many variations and modifications may be made in the apparatus and in the method of its application to pipelines without departing from the spirit or purpose of the invention. With some welding systems, e.g. for the front end internal welder, a single generator may suffice and it may be mounted in axial alignment or at one side of the drive motor 12. Position sensitive devices such as mercury switches, pendulums, or other obvious devices may be used interchangeable, as is also the case with drive motors. These may be fluid operated, or electric, or even gasoline powered, individually. As noted above, steering means are preferably operated automatically in response to signals from position sensitive devices; in some cases, however, manual steering may be used, or may supplement the automatic control means. It may be desirable in some cases to have automatic steering of both the side mounted guidance wheels and the castered front wheels; in other cases, one of these may be controlled manually, as by a human operating riding the carriage or walking alongside and using a tiller, steering wheel or other equivalent control means. Preferably the rear wheels will be arranged to add stability, although preferably being closer together than the front wheels for reasons already explained. In some cases, it may be justifiable to incorporate a differential gearing between the two rear wheels so that they can be spaced more widely apart for better stability. And in still other cases, it may be permissible to allow the rear wheels on a solid axle some slippage, as they follow around curves, spacing them more widely than shown in FIG. 2, for example. The emergency brake means may be arranged to stop the carriage from rolling along the pipeline, using a motion sensitive control means, etc.

To the best of applicants' knowledge, electric welding generators have not been previously supported on a pipeline in this manner, probably because of their relatively heavy weight, size, and difficulties in keeping them in proper place. It is believed that the mounting system of this invention, together with the steering and/or stabilizing means, and other parts in combination, have particular novelty and merit. Those skilled in the art can no doubt provide equivalent means. In any case, it is intended by the claims which follow to cover the invention herein described, its equivalents and all obvious modifications, alterations, substitutions, etc., such as would occur to those skilled in the art, as broadly as the state of the art properly permits.

What is claimed is:

1. A carriage apparatus adapted to ride substantially in an upright position on and along a pipeline, for transporting and supporting heavy equipment such as welding power generating means and related equipment along said line which comprises, in combination, a carriage structure elongated along the line, power driven traction means at one end of said structure for supporting said structure on and propelling it along said line, a pair of swivel mounted laterally spaced wheels at the other end of said structure normally engaging sides of the pipeline and substantially below its top for imparting lateral stability thereto, a secondary pair of steering wheels adapted to engage the sides of the pipeline, sensing means for detecting incipient tilting of the structure away from its normal substantially upright position, and means connected to and responsive to operation of the sensing means for controlling the secondary steering wheels to restore the carriage to stable upright position in case of movement to incipient instability.

2. Apparatus according to claim 1 which comprises a clamping or braking means on the carriage for positively gripping the pipeline to hold the carriage securely on said pipeline when the carriage is not traveling.

3. Apparatus according to claim 2 which comprises a pair of friction shoe elements for engaging opposite sides of said pipeline.

4. Apparatus according to claim 2 in which the clamping or braking means comprise a pair of opposed friction brake shoe elements mounted on pivoted arms, and power activated means for firmly moving said arms about their pivots to and holding them in braking or clamping position.

5. Apparatus according to claim 4 in which hydraulic means are provided for moving and holding the brake shoes in said clamping or braking position.

6. Apparatus according to claim 1 which comprises a separate pair of guidance wheels each mounted in a steerable subframe pivoted to the carriage, and means sensitive to a movement of the carriage towards instability for steering said subframe in a direction to oppose and correct said movement.

7. Apparatus according to claim 1 in which the sensitive means includes a mercury switch arranged to make contact when the carriage moves toward an unstable position and means under control of said switch for correcting said movement by shifting said steerable subframe.

8. Apparatus according to claim 1 in which the sensitive means includes a pendulum and means activated by a shift of said pendulum indicative of a movement of the carriage towards instability for steering the subframe in a direction to reverse and correct said movement.

9. Apparatus according to claim 1 which comprises an outrigger wheel mounted on said carriage to stabilize said carriage on said pipeline.

10. Apparatus according to claim 1 in which each of the secondary steering wheels is mounted in a steerable subframe connected to the carriage, the subframe including a fixed link and a compressible-extensible resilient link connected in such manner such that change in compressive force applied to said resilient link by a shift of the carriage towards an unstable position causes a corrective steering movement of said subframe.

* * * * *